United States Patent [19]
Stankowski

[11] Patent Number: 6,149,109
[45] Date of Patent: Nov. 21, 2000

[54] CABLE MOUNT CONSTRUCTION

[76] Inventor: Ralph Stankowski, 18 Boutwell Hill Rd., Westford, Mass. 01886

[21] Appl. No.: 09/315,476

[22] Filed: May 20, 1999

[51] Int. Cl.⁷ ....................................................... F16L 3/12
[52] U.S. Cl. ...................... 248/74.3; 24/16 PB; 248/68.1
[58] Field of Search ................................ 248/74.3, 74.2, 248/74.1, 68.1, 73; 24/16 PB, 17 AP

[56] References Cited

U.S. PATENT DOCUMENTS

| | | | |
|---|---|---|---|
| D. 316,511 | 4/1991 | White, Jr. ................................. | D8/373 |
| D. 347,782 | 6/1994 | Wentzel ............................ | 248/74.3 X |
| D. 401,498 | 11/1998 | Caveney ................................... | D8/356 |
| 3,632,071 | 1/1972 | Cameron ................................ | 24/16 PB |
| 4,389,754 | 6/1983 | Sohma ................................... | 24/16 PB |
| 4,805,856 | 2/1989 | Nicoli et al. .......................... | 248/74.3 |

*Primary Examiner*—Ramon O. Ramirez
*Attorney, Agent, or Firm*—Paul J. Cook

[57] ABSTRACT

A cable mount for securing a cable bundle is provided which comprises a cable tie having a locking head and a support plate. The support plate is provided with openings which permit passage of the cable tie therethrough. An extension such as a ratcheting pawl or beads are positioned adjacent or within at least one of the openings which frictionally supports the cable tie within the opening prior to locking a leading edge of the cable tie within the locking head thereby to secure the cable bundle to the support plate.

19 Claims, 9 Drawing Sheets

CABLE MOUNT CONSTRUCTION

BACKGROUND OF THE INVENTION

1. Field of the Invention

This invention relates to a mount structure for a fastener for securing one or more wires or the like to a substrate surface.

2. Description of the Prior Art

It is desirable to attach a wire bundle to a substrate surface devoid of special structural attachment features to permit laying of wires at low cost. A variety of cable tie supports are presently available as disclosed in U.S. Pat. Nos. 4,188,004; 4,805,856; Des. 401,498; Des. 347,782 and Des. 316,511.

These supports typically comprise a plate that has an adhesive layer or mounting holes for securing the support to a substrate surface. These supports provide a structural means for positioning a cable tie into the support to form an interconnectable unit. A wire bundle can then be effectively positioned relative to the cable tie and support, encircled with the strap of the cable tie and secured to the support by locking the strap within the head of the cable tie. These prior supports thus require careful manipulation of a loose piece cable tie into locking engagement with a support and the subsequent careful threading of the strap into the cable tie head.

Many times, it is necessary to position the mounting plate on a vertical substrate in a place where it is awkward to manipulate. These conditions render it difficult to first position the cable tie into the support plate and subsequently position the wire bundle so that it can be secured by the cable tie secured within the locking head.

Accordingly, it would be desirable to provide a cable mount including a support plate and a cable tie which facilitates positioning and locking the cable tie on the support plate particularly when the support plate is positioned on a vertical surface. Such a cable mount would permit more efficient laying of cable even in areas where access is awkward.

SUMMARY OF THE INVENTION

The present invention provides a cable mount including a support plate and a cable tie wherein the support plate includes at least one extension such as a ratcheting pawl which contacts the cable tie to retain the cable tie in place within the support plate prior to tying the cable tie about a wire bundle. The extension retains the cable in a stationary position after it is placed by hand into a desired position in the support place by a user, By permitting the cable tie to be positioned into the desired position, the user then can position additional cable mounts along a desired path for which the wire bundle is laid without having to reposition the previously positioned cable ties. The cable ties then can be tightened by the user along the wire bundle path without the need for repositioning the cable ties even when the cable ties and support plates are positioned on a vertical surface.

DESCRIPTION OF SPECIFIC EMBODIMENTS

Figure 1:
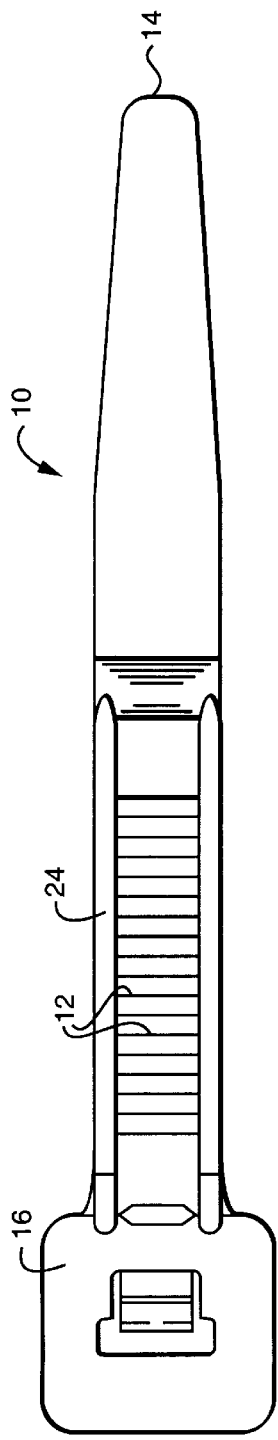
FIG. 1 is a top view of a cable tie used in the cable mount of this invention.
Figure 1A:
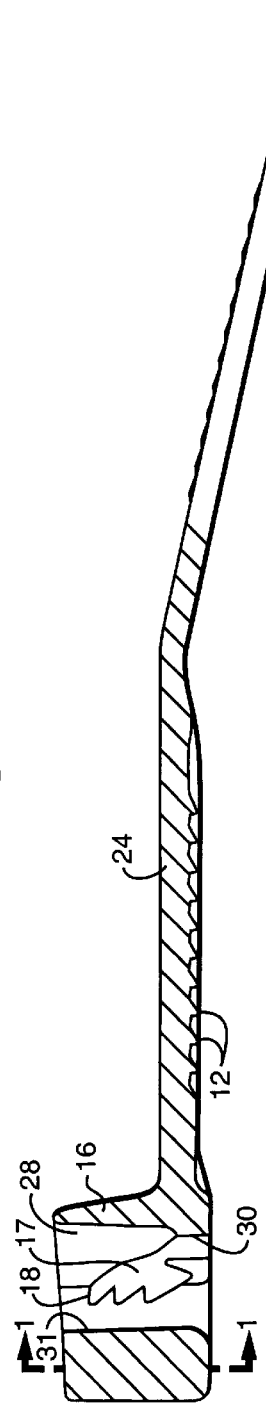
FIG. 1a is a partial cross-sectional view of the cable tie of FIG. 1.
Figure 1C:
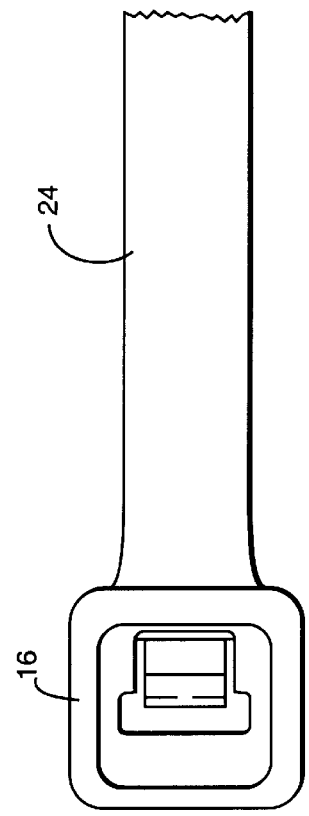
FIG. 1c is a partial bottom view of the cable tie of FIG. 1.
Figure 1B:
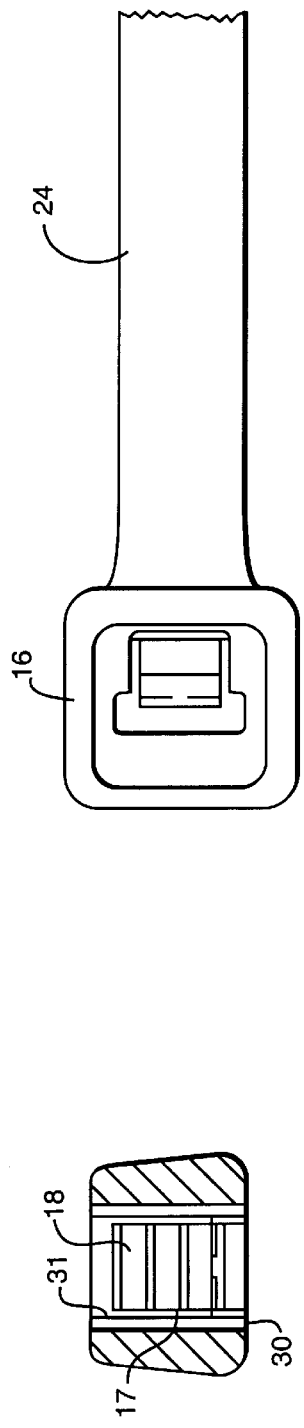
FIG. 1b is a cross-sectional view of the cable tie of FIG. 1a taken along line 1—1.

Referring to FIGS. 1, 1a, 1b, 1c and 2 a, the cable tie 10 includes a row of teeth 12, a leading edge 14 and a locking head 16. The locking head 16 includes a release lever 17 and an integral locking pawl 18 formed within a strap receiving opening 28. The release lever 17 is positioned within head opening 28 and functions to unlock pawl 18 from teeth 12 thereby to allow removal of strap 24 from head 16. Head 16 includes strap entry face 30 disposed on a side of cable tie 10 common to the row of teeth 12 and a strap exit face 31 on the opposite side of cable tie 10.

Figure 2:
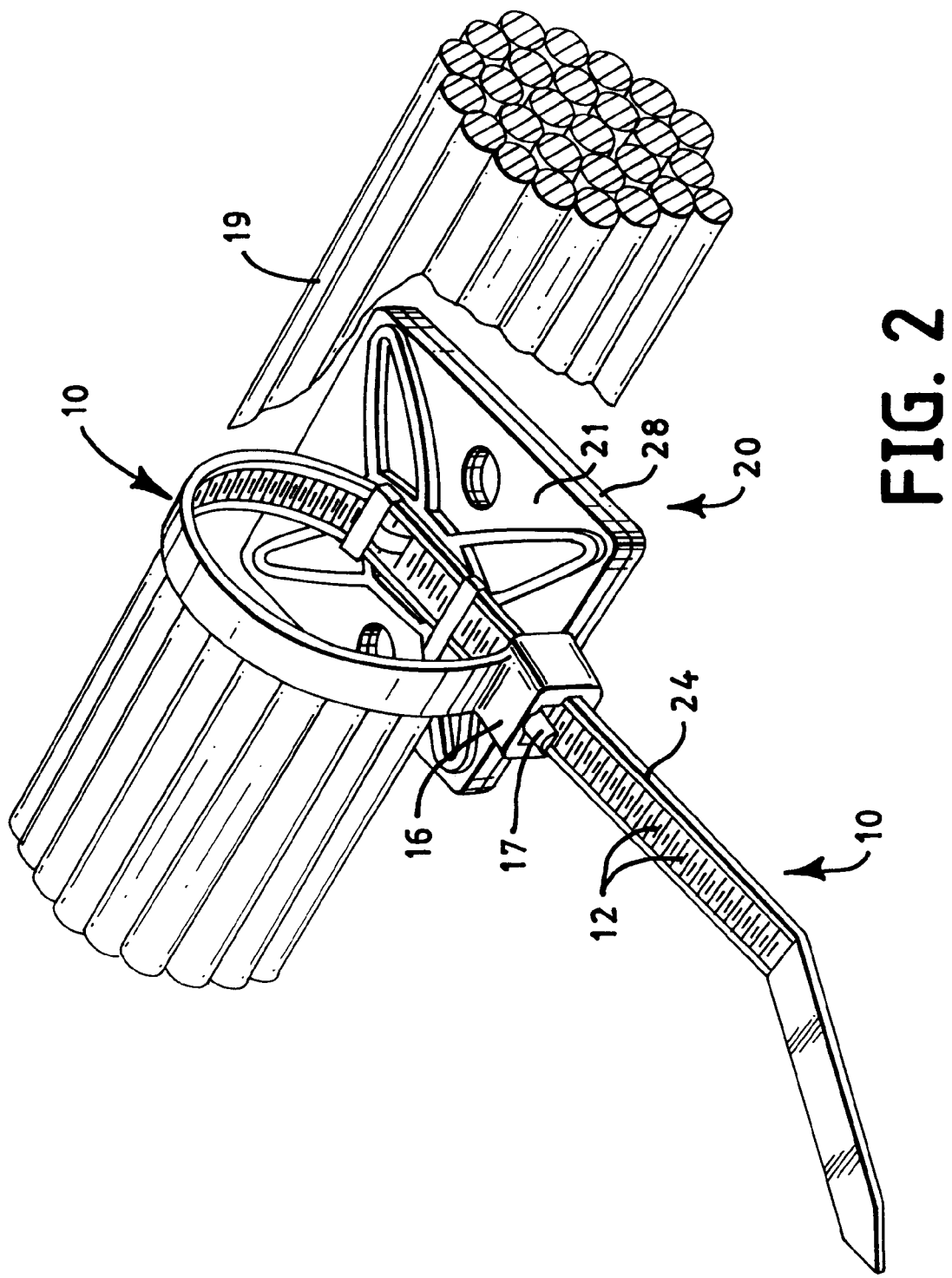
FIG. 2 is an isometric view of the cable mount of this invention in use with a wire bundle.
Figure 2A:
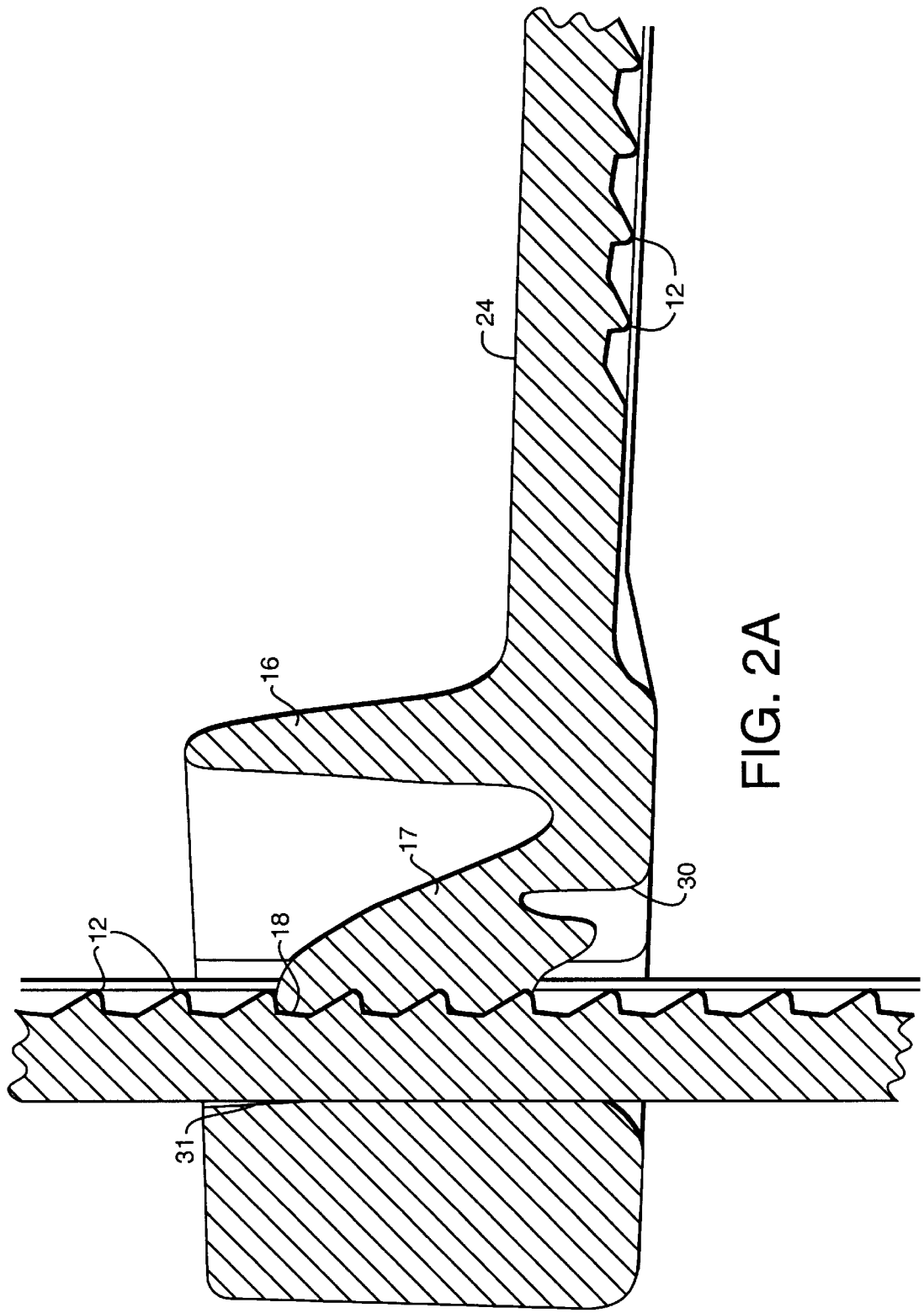
FIG. 2a is a partial cross-sectional view of a cable tie locked within the support plate of this invention.
Figure 3:
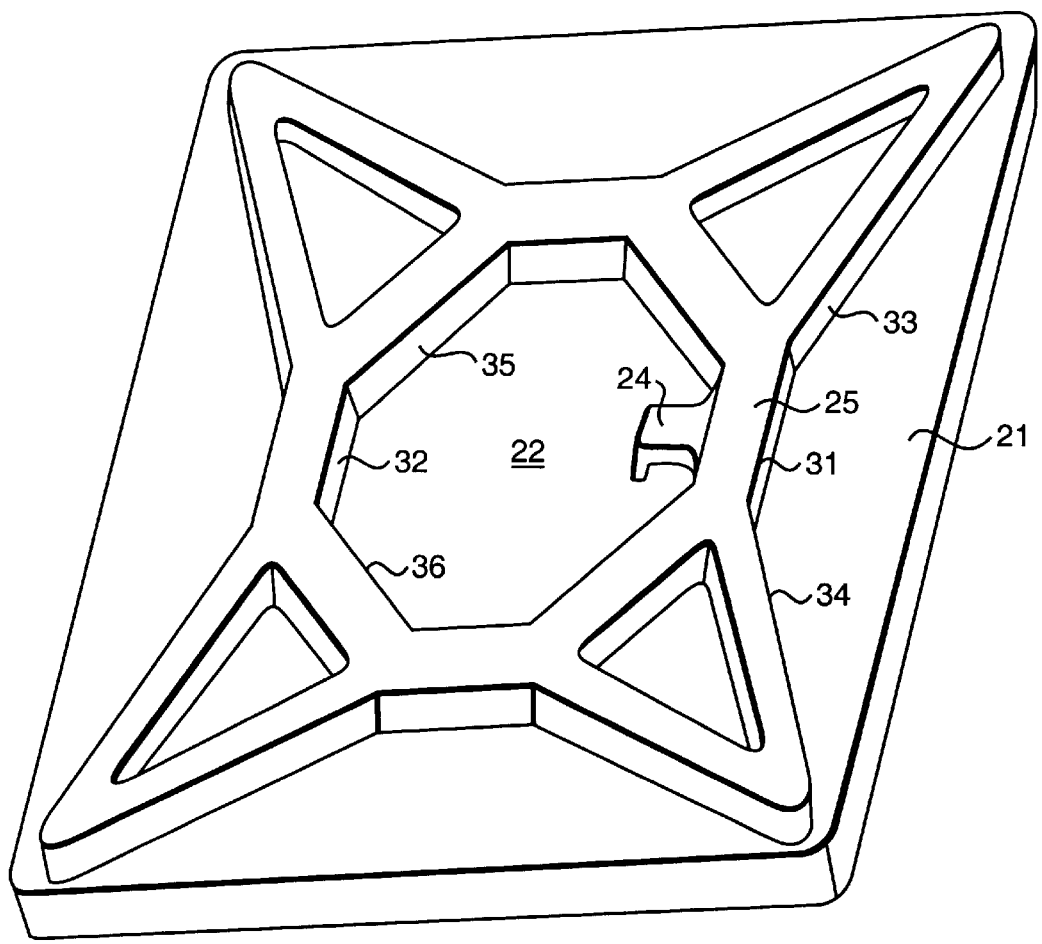
FIG. 3 is an isometric view of a support plate useful in the cable mount of this invention.
Figure 4:
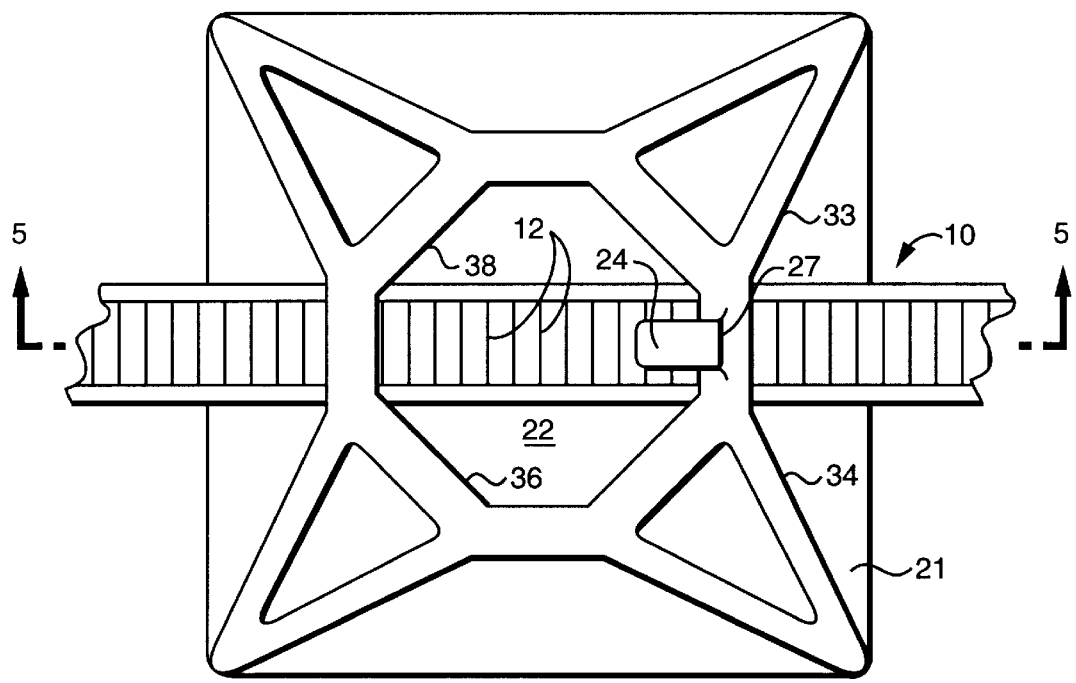
FIG. 4 is a top view of the cable mount of this invention.
Figure 5:
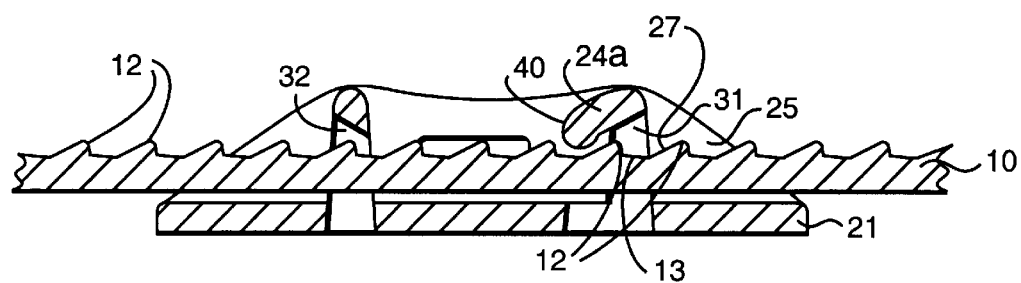
FIG. 5 is a cross-sectional view of the cable mount of FIG. 3 taken along line 4—4.

Referring to FIGS. 2, 3 and 5, a cable mount for tying a wire bundle 19 embodying the concept of the present invention is designated generally by the number 20. Cable mount 20 includes a support plate 21 and a high strength releasable cable tie 10. The cable mount 20 is injection molded of a suitable thermoplastic as is known in the art, such as nylon or an polyolefin. Cable mount 20 is molded as an integral unit to form support plate 21, an enclosed area 22 and a ratcheting pawl 24a. The support plate 21 includes two holes 26 and 27 through which a fastening means such as a screw can be positioned to secure plate 21 onto a substrate. Alternatively, the support plate can be positioned with an adhesive which is exposed by removing strip 28. Support plate 21 includes a cable tie entrance 31 and a cable tie exit 32. The wall surfaces 33 and 34 are tapered toward entrance 31 to facilitate positioning the leading edge 14 of the cable tie 10 into the entrance 31. When the leading edge 14 strikes either surface 33 or surface 34, it slides toward the entrance 31 when the cable tie 10 is pushed toward entrance 31. Similarly, when the leading edge 14 is within area 22, and it is pushed toward exit 32, the wall surfaces 35 and 36 function in the same manner as surfaces 33 and 34 to direct leading edge 14 toward exit 32.

Ratcheting pawl 24a comprises a means of this invention for securing cable tie 10 in place on support plate 21 while being extended through entrance 31 and exit 32. The ratcheting pawl 24a cooperates with the space 13 between adjacent teeth 12 to retain the cable tie by frictional forces in the position shown in FIG. 5. The ratcheting pawl 24a is connected to the wall 25 by means of a living hinge 27 which permits the pawl 24a to move about the hinge 27 so that the pawl 24 can be moved into or out of contact with space 13 between adjacent teeth 12. It is preferred that the leading edge 40 of ratcheting pawl 24a be curved so that the cable tie 10 is held in place by the pawl 24a while avoiding locking the cable tie 10 in place. This permits the user to subsequently move the cable tie 10 to a final desired position about the wire bundle 19.

Figure 6:
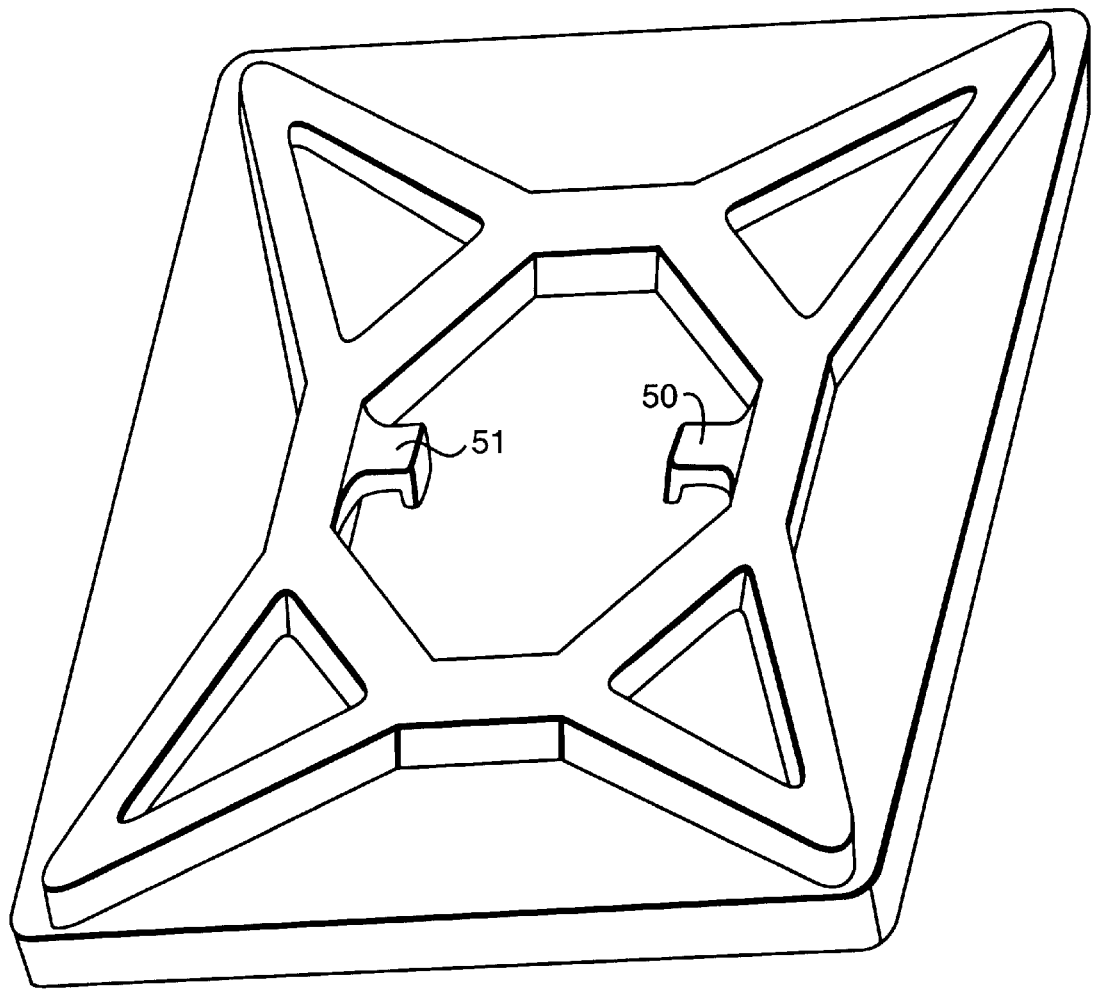
FIG. 6 is a top view of an alternative embodiment of this invention.

Referring to FIG. 6, an alternative embodiment of this invention is shown which utilizes two opposing ratcheting pawls 50 and 51 having the construction described above for use along a length of a cable tie in the manner described above. The use of two ratcheting pawls provides added support for a prepositioned cable tie, particularly when the cable mount is positioned on a vertical substrate surface.

Figure 7:
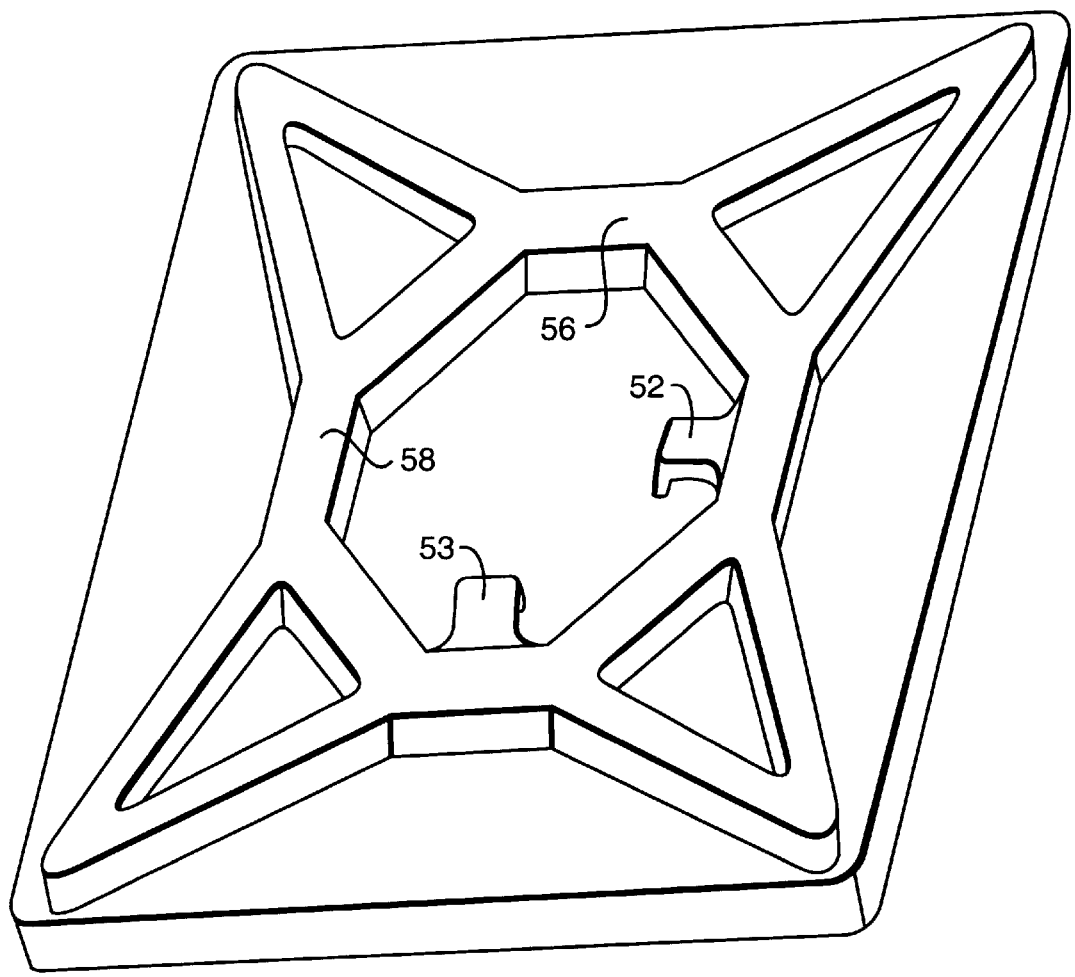
FIG. 7 is a top view of an alternative support plate embodiment of this invention.

Referring to FIG. 7, an alternative embodiment of this invention is shown which utilizes two ratcheting pawls 52 and 53 positioned to be used on a choice of two normal paths of a cable tie through a cable mount and having the construction described above. The use of two ratcheting pawls in this manner provides added flexibility of use of the cable mount. In addition, it is to be understood that additional ratcheting pawls can be positioned at walls 56 and 58 to provide additional support for a prepositioned cable tie, particularly when the cable mount is positioned on a vertical substrate surface.

Figure 8:
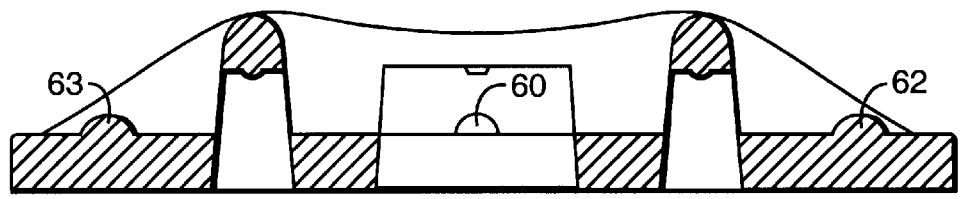
FIG. 8 is a cross-sectional view of an alternative embodiment of this invention.
Figure 9:
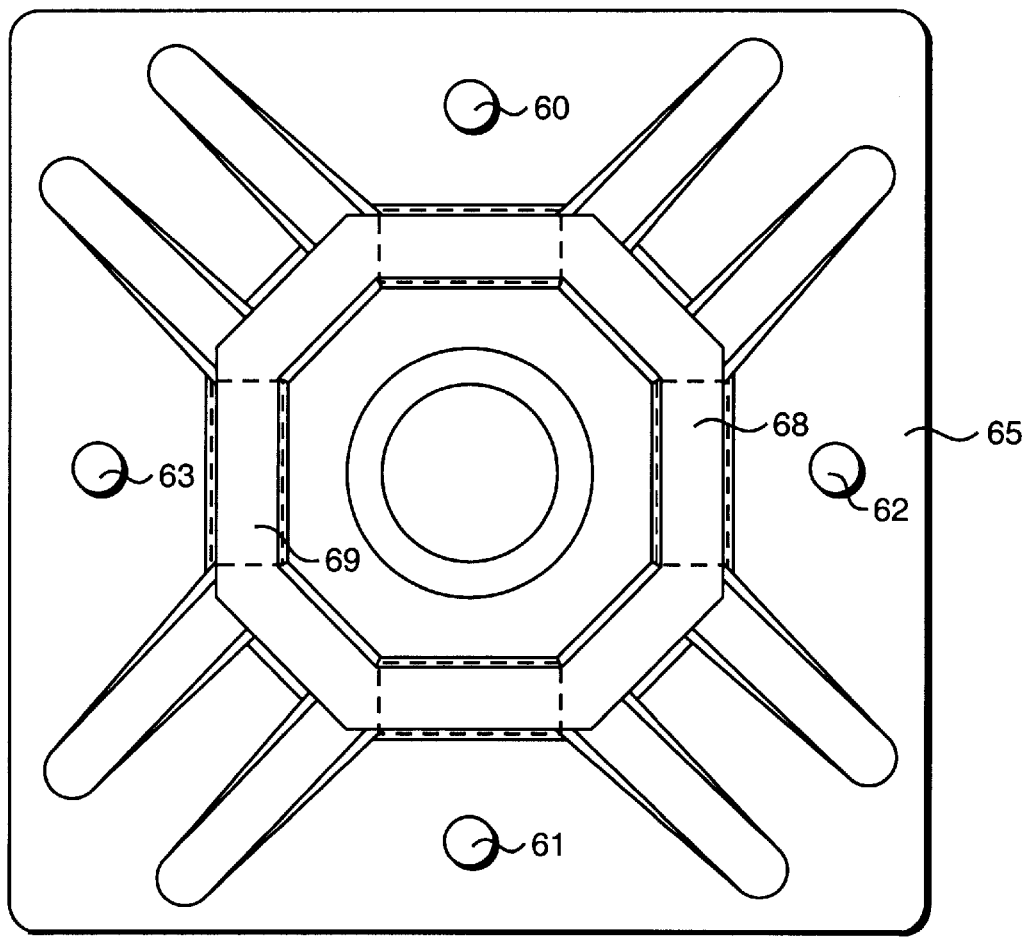
FIG. 9 is a top view of the embodiment of FIG. 8
Figure 10:
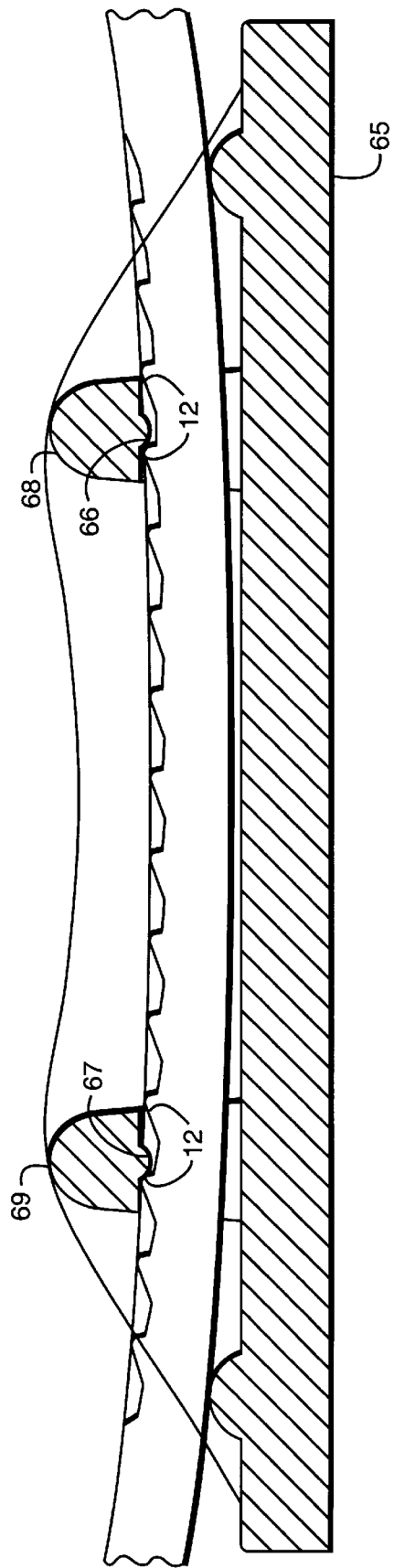
FIG. 10 is a cross sectional view of the cable mount of this invention utilizing the support plate of FIG. 8.

Referring to FIGS. 8, 9 and 10, an alternative cable mount and support plate construction of this invention is illustrated for retaining a cable tie in position on a support plate. The support plate includes a set of two beads 60 and 61 or 62 and 63 which are positioned on a path for a cable tie 64. The beads 60 and 61 or 62 and 63 serve to bend the cable tie 64 and to apply a frictional force to the cable tie 64 when it is positioned on support 65. This frictional force is sufficient to retain cable tie 64 in the desired path on support plate 65 when surrounding a cable bundle (not shown). In an alternative embodiment, beads 66 and 67 can be formed such as when molding support plate 65 or supports 68 and 69. During use, the beads 66 and 67 can fit between teeth 12 thereby to apply additional frictional force had 64 on the cable tie 64 thereby to effect retaining the cable tie in place on the support plate 64. It is to be understood that one bead 60, 61, 62 or 63 can be utilized to improve cable tie retention by frictional force on the support plate.

I claim:

1. A cable mount comprising:
   a cable tie, including a strap having a free end and an opposite end joinable to a strap locking head, said locking head having a strap receiving opening therein,
   a support plate including openings formed above the support plate for positioning the strap;
   at least one extension positioned adjacent at least one of said openings for frictionally securing said strap to said support plate,
   and a mounting means for securing the support plate to a substrate.

2. A cable mount of claim 1, including two of said extensions, each of said extensions positioned at one opening and said openings positioned along a straight line.

3. The cable mount of any one of claims 1 or 2 wherein said extensions are attached to a living hinge.

4. The cable mount of any one of claims 1 or 2 wherein each of said extensions has a leading rounded edge.

5. The cable mount of claim 3 wherein said extension has a leading rounded edge.

6. The cable mount of any one of claims 1, 2, or 5 wherein said extension includes a leading edge shaped to fit between two adjacent teeth on said cable tie.

7. The cable mount of claim 3 wherein said extensions include a leading edge shaped to fit between two adjacent teeth on said cable tie.

8. The cable mount of claim 4 wherein said extensions include a leading edge shaped to fit between two adjacent teeth on said cable tie.

9. A cable mount as set forth in any one of claims 1 or 2 wherein said openings include strap guide walls which converge toward said openings.

10. A cable mount as set forth in claim 3 wherein said openings include strap guide walls which converge toward said openings.

11. A cable mount as set forth in claim 4 wherein said openings include strap guide walls which converge toward said openings.

12. The cable mount as set forth in any one of claims 1 or 2 wherein said at least one extension comprises a set of two beads formed integrally with said plate positioned to apply a frictional force on a surface formed with teeth of said cable tie in contact with said beads.

13. A cable mount as set forth in any one of claims 1 or 2 wherein the mounting means includes a lamina of pressure sensitive adhesive.

14. A cable mount as set forth in any one of claims 1 or 2 wherein the mounting means includes fastener accepting holes in the support plate.

15. A cable mount as set forth in claim 3 wherein the mounting means includes a lamina of pressure sensitive adhesive.

16. The cable mount as set forth in any one of claims 1 or 2 wherein said at least one extension comprises at least one bead formed integrally with said plate positioned to apply a frictional force on a smooth surface of said cable tie in contact with said beads.

17. The cable mount as set forth in any one of claims 1 or 2 wherein said at least one extension comprises at least one bead formed integrally with said plate positioned to apply a frictional force on a surface formed with teeth of said cable tie in contact with said beads.

18. The cable mount as set forth in any one of claims 1 or 2 wherein said at least one extension comprises two sets of two beads formed integrally with said plate, one set of said beads positioned to apply a frictional force on a surface formed with teeth of said cable tie in contact with said beads and a second set of said beads positioned to apply a frictional force on a smooth surface of said cable tie in contact with said second set of beads.

19. The cable mount as set forth in any one of claims 1 or 2 wherein said at least one extension comprises a set of two beads formed integrally with said plate positioned to apply a frictional force on a smooth surface of said cable tie in contact with said beads.

* * * * *